Figure 1:
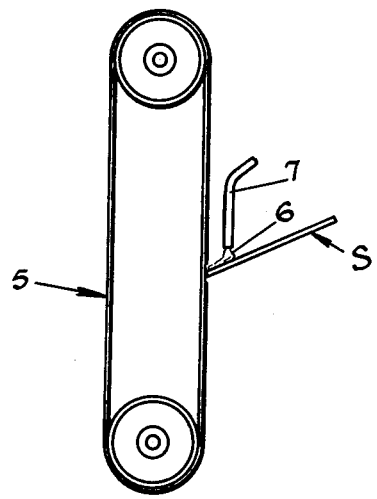

April 26, 1955　　W. C. LEVENGOOD　　2,706,876
GLASS GRINDING
Filed June 28, 1954

INVENTOR.
William C. Levengood
BY
Nobbe & Swope
ATTORNEYS

2,706,876
GLASS GRINDING

William C. Levengood, Toledo, Ohio, assignor to Libbey-Owens-Ford Glass Company, Toledo, Ohio, a corporation of Ohio Application June 28, 1954, Serial No. 439,571

5 Claims. (Cl. 51—283)

The present invention relates to the grinding of glass and more particularly to the elimination of scratches and fractures in such material.

Glass oftentimes ruptures or fractures for no apparent reason in areas where it has been subjected to grinding and polishing processes, and it has been found that the origin of such fractures or ruptures is most always located along the edge portions thereof. This phenomenon holds true with all edge ground glass such as bent glass as well as with fresh cut sheet and plate glass containing raw and sharp edges, and generally speaking, it is believed that these fracture origins at the edges of the glass indicate that the weakest portions are located along such edge areas.

It is therefore a primary object of this invention to provide a method of eliminating edge fractures and scratches in glass, and particularly in sheet glass.

Another object of the invention is to provide a method of increasing the thermal shock resistance of ground edges which are generally more susceptible to thermal shock than are the cut or raw edges of glass sheets.

Another object of the invention is to provide a method of treating edges of glass sheets which will facilitate subsequent polishing of the sheets and will result in polished sheets of improved surface quality.

In attempting to find the cause of the before-mentioned weak edge areas, it was found that surfaces of ground and polished plate glass sometimes contain scratches or streaks commonly referred to as "block reek." Such scratches and streaks, when viewed by an angular surface reflection, are shown to be a composite of minute intermittent rubs and scratches and are believed to be caused by chips of glass embedded in the polishing felts which scratch or abrade the glass sheets during polishing. These chips are believed to originate along the edge portions of the sheets when they are polished, and to be caused by thermal shock created when the rouge water polishing solution, at a temperature of approximately 80° F., strikes the glass being polished with a surface temperature of well over 200° F. To alleviate this condition, it was found that such edge chipping could be reduced considerably by altering the surface structure of the edge in such a manner as to prevent or reduce the formation of the microscopic fissures that extend into the body of the glass and act as origins for the said chips or fractures.

According to the present invention, the altering of the surface structure of the edges of a glass article may be brought about by seaming or grinding the said edges using a water solution of cupric chloride ($CuCl_2 2H_2O$) to uniformly grind the edge portions leaving them substantially free of fine fissures.

Figure 2:
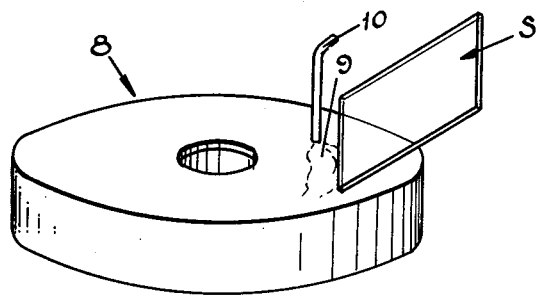

In the accompanying drawings:

Fig. 1 illustrates a belt seaming method of altering the surface structure of an edge of a glass article using the composition of the invention; and Fig. 2 illustrates a second method of altering the surface structure of an edge of a glass article using an edging wheel and the above mentioned composition.

With reference now to the drawings, there is shown in Fig. 1 a manner of edging a glass sheet S by means of a conventional belt seaming device 5 using a solution of cupric chloride 6 which is applied to the edge of the said sheet by means of a pipe or conduit 7.

In Fig. 2 there is shown a manner of edging a sheet S by means of a conventional edging or grinding wheel 8 with the cupric chloride 9 being deposited on the surface of the wheel by a pipe or conduit 10.

By edging or seaming the glass articles in the manner described above using the cupric chloride solution of the invention, a very decided decrease is obtained in the number of edge fissures or cracks. Such reduction of fissures was found to produce a very decided increase in the thermal shock resistance of the glass as will be noted below in Table I. In this table, the number of fractures in dry-ground edges of 3" x 3" samples are compared with the number of fractures in similar samples treated with cupric chloride. To produce the desired thermal shock effect all of the samples were heated in an oven and then quenched in water at 3° C.

TABLE I

| Oven Temperature, ° C. | Number of Fractures on Dry Ground Edge | Number of Fractures on Cupric Chloride Treated Edge |
|---|---|---|
| 95 | 10 | 0 |
|    | 7  | 1 |
|    | 7  | 0 |
| 85 | 4  | 0 |
|    | 9  | 0 |
| 75 | 3  | 0 |
|    | 4  | 0 |

Further illustrations of the effect of the cupric chloride edging on the thermal shock resistance of the glass are given in the following examples.

EXAMPLE 1

A group of 50 samples of ground and polished plate glass 4" x 4" by ¼" thick were edged on a roughing wheel using only water. A second group of 50 similar plate glass samples were then edged while applying a 5% cupric chloride solution to the roughing wheel. The rate of flow of the cupric chloride solution was observed to be approximately the same as the flow of water used with the untreated group. Thermal shock tests were run at 1° C. intervals starting at a temperature low enough to insure zero breakage and increasing in 1° increments until all samples were broken by being individually quenched in an ice water bath at zero degrees centigrade. The average maximum and minimum breakage temperature differences are given in Table II below.

TABLE II

Average temperature before breakage by quenching in ice water of rough ground ¼" plate glass

| Group | Average, °C. | Maximum, °C. | Minimum, °C. |
|---|---|---|---|
| Untreated | 78.4 | 87 | 70 |
| Cupric Chloride Treated | 81.8 | 105 | 73 |

From the above two examples, it will be noted that the group of samples edged on the roughing wheel show that the average breaking temperature of the cupric chloride-treated samples was 5.4% higher than the untreated group, and the temperature necessary to produce 100% breakage of the treated group was 18° C. higher than the untreated rough edge group.

EXAMPLE 2

Twenty-five samples of 4" x 4" by ⅜" glass were edge ground on a smooth flat rock or fine polishing stone using water, while a similar number were ground while applying a 5% solution of cupric chloride as described above. In this example, the samples were cut from ⅜" plate glass instead of ¼" plate glass to permit a lower average plate glass temperature. The samples were quenched in the same manner described above in Example 1 and the results are given below in Table III.

TABLE III

Average temperature before breakage by quenching in ice water of ⅜" glass

| Group | Average, °C. | Maximum, °C. | Minimum, °C. |
|---|---|---|---|
| Untreated | 62.8 | 68 | 56 |
| Cupric Chloride Treated | 70.1 | 82 | 61 |

In Example 2, it will be noted that the samples treated with cupric chloride and ground on the fine wheel broke at an average temperature of 11.6% greater than the untreated group, and temperature necessary to produce 100% breakage was 14° C. greater. Thus, the results show that the thermal shock resistance of the glass is greatly improved by the use of cupric chloride during the edging process.

While the above examples indicate a very decided increase in the strength of glass edged with the cupric chloride solutions, the concentration of the solution used for these tests, as noted above, was kept at approximately 5%. However, it has been found that the concentration of the cupric chloride solution may be varied to produce even greater resistance to thermal shock as will be apparent from the following example.

EXAMPLE 3

Twenty samples of ground and polished glass 4" x 4" by ⅜" were edged on coarse and fine horizontal wheels using each of the concentrations of cupric chloride listed below in Table IV. The thermal shock tests were run at 1° C. intervals starting at a temperature low enough to insure zero breakage and the samples were removed individually from the water bath and quenched in ice water at 0° C.

TABLE IV

*Effect of various percentages of cupric chloride on thermal shock resistance*

| Percent Cupric Chloride | Average Temperature Before Breaking by Quenching | | |
|---|---|---|---|
| | Ave., ° C. | Max., ° C. | Min., ° C. |
| 0 | 62.1 | 70 | 55 |
| 2.5 | 65.5 | 75 | 58 |
| 5.0 | 67.4 | 77 | 59 |
| 10.0 | 69.5 | 82 | 59 |
| 20.0 | 67.7 | 74 | 59 |

As will be noted above in Table IV, the results show that the optimum concentration of cupric chloride in the solution is approximately 10%, while decided beneficial results were obtained from solutions within the range of 2.5% to 20% cupric chloride.

Th samples used in Example 3 were all given a medium edging in which the flat ground surface on the corner edges of the sample was from ²⁄₆₄" to ³⁄₆₄" in width. However, further tests were made to determine what effect the width of the ground edge had upon the thermal shock characteristics of the samples. In this instance, an edge approximately ⅟₆₄" in width was ground on the samples using a fine wheel grinding and a 10% cupric chloride solution, and an edge approximately ⁴⁄₆₄" was placed on a second group of 10 samples using a similar solution. The results of these tests are shown below in Table V.

TABLE V

*The effect of various degrees of edging on thermal shock resistance*

| Degree of Grind | Average Breakage Temperature, ° C. |
|---|---|
| Light Grind, ⅟₆₄" strip | 69.1 |
| Heavy Grind, ⁴⁄₆₄" strip | 70.2 |

From the above table it will be noted that there is a difference of approximately 1° C. in the temperature of the samples before breakage between those that were ground lightly (⅟₆₄") and those that were ground heavily (⁴⁄₆₄"), thus showing that variations in edge grinding have little if any effect upon the thermal shock properties when cupric chloride is used.

A further test was made to determine if any improvement in the strength of the glass was obtained if the cupric chloride solutions were applied after grinding. In this instance, three groups of 10 samples were ground on a rough wheel with the first group being untreated, the second group being edge buffed with a felt wheel while applying a 10% solution of cupric chloride, and the third group being rubbed on the edges thereof with a rag soaked in a 10% cupric chloride solution. The results as indicated in Table VI show a slight improvement by using the felt wheel and a decrease in the strength after applying the cupric chloride with a rag, but as will be noted, the overall difference is so slight that it is not believed that the effect of applying the cupric chloride after grinding makes any appreciable difference in the thermal shock qualities of the glass.

TABLE VI

*Effect of applying the cupric chloride after grinding*

| Condition | Average Breakage Temperature, ° C. |
|---|---|
| As Ground | 68.5 |
| Buffed on Felt Wheel | 69.2 |
| Rubbed on with Rag | 67.5 |

From the foregoing consideration of the effect of cupric chloride upon the thermal shock characteristics of glass and also upon the chipping characteristics thereof, it will be readily apparent that the thermal shock resistance can be increased substantially by grinding the edges of glass sheets using a cupric chloride solution of between 2.5% and 20% to reduce the fissures and cracks that ordinarily emanate from the weak edge areas of glass sheets.

As illustrative of one particular use of the cupric chloride solution described herein, it was found that glass used in the production of tempered sheets oftentimes breaks or blows up during the initial heating in the tempering furnace because of fine fissures or cracks that are created when the sheets are edged. To correct this condition, the edges of a group of 45 sheets were ground using a 10% solution of cupric chloride as described herein, and an examination in a polariscope disclosed that the seamed edges in the treated sheets contained less peripheral strain than did untreated sheets. Over a two week production period the overall breakage figure for the treated group was improved 60% over a group of sheets which were untreated and tempered according to the conventional method.

While one specific use of the invention has been given, the invention is not limited in its application as it has particular utility when used in the edge finishing of automotive glass, the grinding of the edges of plate glass between the grinding and polishing operations in the production of the plate glass, and also in the finishing of large plate glass windows, and in the production of tempered glass such as doors, stove lights, etc.

It is also to be understood that various modifications may be made in the composition and procedure herein disclosed without departing from the spirit and scope of the invention as defined in the appended claims.

I claim:

1. The method of improving the thermal shock resistance of glass articles, including the step of applying a solution of cupric chloride to said article while grinding the edge portions thereof.

2. The method of reducing breakage in glass articles, including the step of grinding the edge portions of said article while simultaneously applying a solution of from 2.5% to 20% cupric chloride.

3. The method of reducing breakage in vitreous siliceous articles, including the steps of applying a water solution of from 5% to 20% cupric chloride to an edge portion of said articles, and simultaneously grinding the said edge portion.

4. The method of reducing breakage in vitreous siliceous articles, including the steps of grinding the edge portions of said article, and applying an approximately 10% solution of cupric chloride to said edge during the grinding thereof to reduce fissures and cracks therein.

5. The method of treating glass sheet material to improve the characteristics thereof, including the steps of applying a solution containing cupric chloride to said sheet, and simultaneously surfacing said sheet in the presence of said cupric chloride solution.

No references cited.